May 15, 1945.   A. E. LACOMBLE   2,376,257
PREPARATION OF HYDROGEN PEROXIDE
Filed Sept. 4, 1940
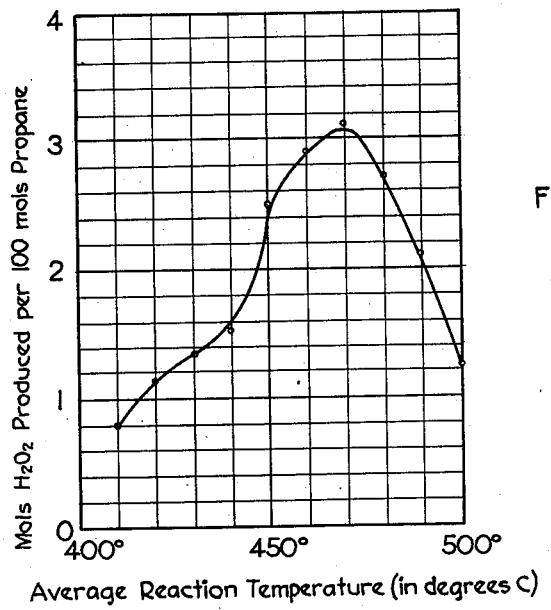
Fig. I
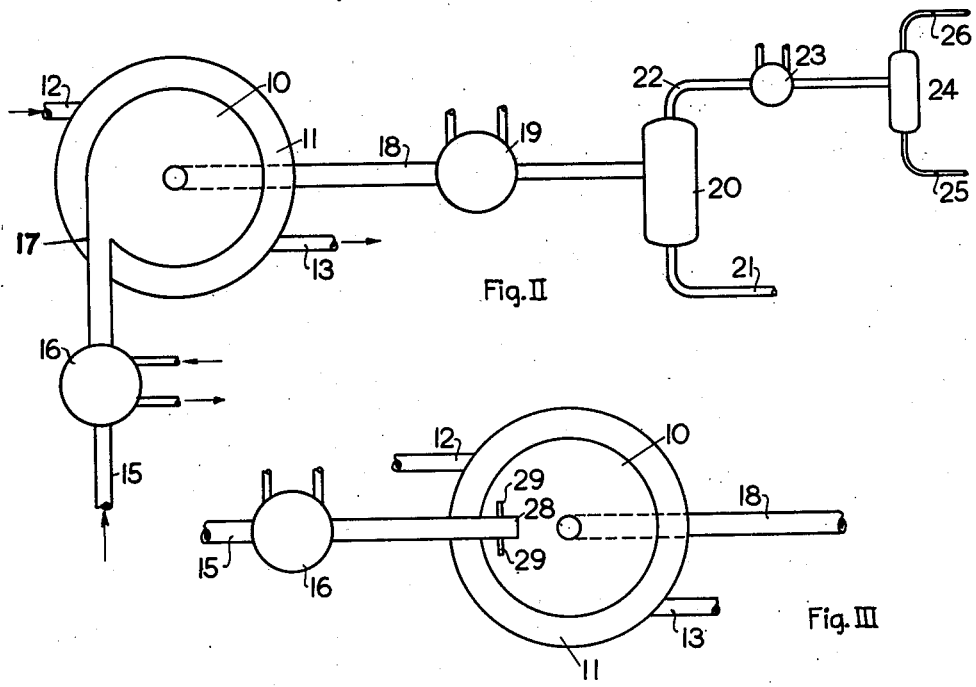
Fig. II
Fig. III
Inventor: Antoine Eugene Lacomble
By his Attorney:

Patented May 15, 1945

2,376,257

UNITED STATES PATENT OFFICE 2,376,257

PREPARATION OF HYDROGEN PEROXIDE

Antoine Eugene Lacomble, Hillsborough, Calif., assignor to Shell Development Company, San Francisco, Calif., a corporation of Delaware Application September 4, 1940, Serial No. 355,297
In the Netherlands April 10, 1940

11 Claims. (Cl. 23—207)

The present invention relates to the oxidation of hydrocarbons, and more particularly pertains to a novel process whereby gaseous saturated hydrocarbons may be oxidized to produce novel peroxide-containing reaction products predominating in or containing relatively high percentages of hydrogen peroxide. Reference is made to my copending application, Serial No. 355,298, of even date herewith.

The prior art is replete with processes of producing alcohols, aldehydes, esters, carboxylic acids and peracids by the controlled, partial or selective oxidation of various hydrocarbons, e. g., hydrocarbons found in natural gases. Such processes are effected by commingling the hydrocarbons with oxygen, air, or other oxygen-supplying materials, and causing a partial combustion or oxidation of the hydrocarbons in the presence or absence of catalysts. It is likewise known that such incomplete oxidation of hydrocarbons may also yield organic peroxides. For example, as has been disclosed by Pease and Munro, J. A. C. S. 56, 2034–2038, the non-explosive incomplete combustion of mixtures of propane and oxygen, when effected for relatively short periods of time and at temperatures of from about 325° C. to about 400° C., besides other products of combustion, also produced various percentages of organic peroxides, the yield of which depended in part on the propane-oxygen ratio employed. In the experiments conducted by the aforementioned authors, this ratio varied between about 3 volume parts of propane per volume of oxygen and about 3 volumes of oxygen per volume of propane employed. As stated in the aforementioned article, the reaction products were analyzed and found to contain organic peroxides and not hydrogen peroxide.

It is well known that hydrogen peroxide possesses strong oxidizing qualities which render this product highly valuable in many reactions. Besides the electric methods of preparing hydrogen peroxide, this product may be produced by the oxidation of a number of aromatic compounds, such as hydrazobenzene, hydrazotoluene, paraethyldrazobenzene, and the like, as well as the amino substituted aromatic hydrazo compounds, such as amino substituted hydrazobenzene. toluene and xylene, and the like. The availability of such compounds as intermediates in the production of hydrogen peroxide is, however, limited by the attainable chemical efficiencies of the reactions involved. Also, the ultimate cost of the hydrogen peroxide is high due to the fact that these intermediates must, of necessity, be first prepared.

It is, therefore, the main object of the present invention to avoid the above and other defects, and to provide an economical and efficient method of producing hydrogen peroxide and mixtures or solutions predominating in or containing relatively high percentages of hydrogen peroxide. Another object is to provide a process for the effective commercial production of organic peroxides and/or hydrogen peroxide by the incomplete oxidation of hydrocarbons. It is a still further object of this invention to provide a process whereby hydrocarbon-oxygen mixtures may be effectively subjected to partial oxidation or combustion on a technical or commercial scale to produce high yields of peroxidic compounds which may or may not predominate in hydrogen peroxide.

It has now been discovered that the above and other objects may be effectively attained by subjecting saturated or unsaturated hydrocarbons of the group more fully described hereinbelow, to a non-catalytic, incomplete and controlled oxidation under certain and relatively defined operating conditions. It has been further discovered that saturated aliphatic and/or alicyclic hydrocarbons, and particularly the gaseous saturated hydrocarbons containing at least two carbon atoms per molecule, may be effectively converted into peroxide-containing reaction products predominating in or containing relatively large proportions or percentages of hydrogen peroxide, by commingling these hydrocarbons with oxygen (or oxygen containing gaseous substances) in ratios of at least four volumes of the hydrocarbon per volume of oxygen (preferably at least seven to nine volumes of the hydrocarbon per volume of oxygen), and subjecting the mixture thus produced to a non-catalytic incomplete oxidation or combustion at reaction temperatures of between about 440° C. and about 500° C., for relatively short periods of time, and preferably out of contact with materials, such as corrosive metals of the type of copper, cast iron, and the like, which retard the oxidation reaction and/or adversely affect the stability of the hydrogen peroxide formed as the result of the incomplete combustion reaction. It has also been discovered that organic peroxides may be produced by subjecting the above-mentioned saturated or unsaturated aliphatic and/or alicyclic hydrocarbons to non-catalytic incomplete oxidation or combustion with oxygen at reaction temperatures of between about 300° C. and about 500° C. for relatively short periods of time and preferably out of contact with materials which retard the oxidation reaction.

Although the process of the invention is applicable to the production of peroxide-containing reaction products predominating in or mainly containing hydrogen peroxide, from aliphatic and/or alicyclic hydrocarbons as a class, it is preferable to employ the normally gaseous saturated aliphatic and alicyclic hydrocarbons having at least two carbon atoms per molecule. Representative examples of this preferred group of hydrocarbons are ethane, propane, n-butane, isobutane, cyclopropane, cyclobutane, and the like. When the process is employed for the production of organic peroxides it is possible to use unsaturated aliphatic and/or alicyclic hydrocarbons such as ethylene, propylene, butylenes, cyclobutylene, and the like. Also, the higher homologues of these compounds, such as the pentanes, hexanes, cyclopentane, cyclohexane, and the like, may also be oxidized in accordance with the process of the present invention. Instead of employing the above hydrocarbons individually, their mixtures with each other, as well as with other hydrocarbons or other organic and/or inorganic gases or gaseous substances, may be employed as the starting materials. For instance, the primary material may contain unsaturated hydrocarbons, such as propylene and the like, or may consist of one or more of the aforementioned saturated hydrocarbons commingled with nitrogen, carbon monoxide, carbon dioxide, and the like. It is, however, to be noted that, when the primary material to be subjected to incomplete combustion, according to the present process, comprises a mixture of the saturated aliphatic and/or alicyclic hydrocarbons and other gases or gaseous substances (of the type defined above), the saturated hydrocarbons should, preferably, comprise at least about 70% by volume of the gaseous mixture subjected to oxidation. Obviously, mixtures containing lesser percentages of the saturated hydrocarbons may also be employed. However, in such cases, the resulting products will contain considerably lower percentages of the desired hydrogen peroxide, and, especially when the impurities are unsaturated hydrocarbons, will contain greater quantities of by-products of the type of alcohols, aldehydes, ketones, carboxylic acids, esters, and the like.

The hydrocarbon-oxygen ratios to be subjected to partial or incomplete oxidation in accordance with the present invention and in an apparatus constituting one of the phases of the invention may vary within relatively wide limits depending on the starting material and on the desired peroxides. For example, as discussed in the aforementioned Pease and Munro article, organic peroxides may be obtained in various percentages by employing hydrocarbon-oxygen (specifically, propane-oxygen) ratios ranging from about three volumes of the hydrocarbon per volume of oxygen to about a volume of the hydrocarbon per three volumes of oxygen.

As noted above, in order to obtain maximum yields of the desired hydrogen peroxide, the volumetric ratios between the saturated hydrocarbons and the oxygen should be maintained within relatively well defined limits. Thus, the hydrocarbon-oxygen volumetric ratio should be at least 4:1. Incidentally, this lowermost ratio is well outside the explosion range, so that any dangers of explosions are completely eliminated. The preferred volumetric ratio is between about 7:1 and 10:1, very good yields of hydrogen peroxides having been obtained by using about nine volumes of saturated aliphatic and/or alicyclic hydrocarbons per volume of oxygen. By employing these relatively high hydrocarbon-oxygen ratios, it is possible to control the oxidation reaction much more readily than when relatively lower ratios are employed. This, in turn, allows the maintenance of the reaction temperature within the limits favoring the production of the desired hydrogen peroxide. Volumetric ratios higher than the aforementioned 10:1 may also be used. However, when the hydrocarbon-to-oxygen ratios become too high, the amount of unreacted hydrocarbons (per pass through the reaction zone) becomes excessive, and the reaction products are thus diluted by large quantities of the unreacted hydrocarbons. Also, the use of excessively high ratios is undesirable since it requires the construction of large reaction chambers to produce a given amount of hydrogen peroxide. In view of what was said above, although no specific upper limit may be definitely stated, it is preferable, particularly when propane-oxygen mixtures are treated according to the present process, to employ volumetric ratios of above 4:1, and preferably between about 7:1 and 10:1.

The reaction period will vary with the hydrocarbon treated and with the desired reaction product. For instance, the formation of organic peroxides from saturated hydrocarbons generally requires shorter reaction periods than do the corresponding unsaturated hydrocarbons.

In order to obtain high yields of hydrogen peroxide, it is also necessary to employ short reaction periods. In other words, the period of time during which the hydrocarbons are subjected to the oxidation reaction should be in the order of a few seconds, after which the products of reaction and the unreacted hydrocarbons, etc., are to be withdrawn from the reaction zone, and cooled, preferably in the manner described hereinbelow, to recover a liquid aqueous solution containing the hydrogen peroxides. Although the optimum reaction period will vary depending on a number of conditions, such as the particular hydrocarbon treated, the hydrocarbon-oxygen ratio employed, the presence or absence of diluents, the reaction temperature, etc., it may be generally stated that the reaction time may be between about 3 and 10 seconds. In the case of propane-oxygen mixtures (when employed in volumetric ratios of 9:1), very good yields of hydrogen peroxide were obtained when the reaction period was in the neighborhood of five (5) seconds, the use of longer reaction times resulting in a production of somewhat lower yields of hydrogen peroxide. In this connection, it must be noted that the above reaction periods refer to the actual time during which the hydrocarbons are subjected to the incomplete combustion or oxidation reaction, and not to the total period of time during which such hydrocarbons are in the reaction vessel. Obviously, when the reaction vessels are so designed and the process is operated in such a manner that the oxidation reaction is initiated immediately after the reactants enter the reactor and if the reaction continues during the passage of the reactants through this reaction vessel, the reaction time will naturally be equal to the residence time of the reactants in the reaction vessel.

However, as noted above, it is preferred to effect the oxidation reaction out of contact with metals or substances which retard the reaction and/or adversely affect the stability of the hydrogen peroxide formed. One method of avoiding such detrimental effect is to construct the reaction vessel from, or line it with, a substance which does not possess the aforementioned detrimental effects. Another method is to convey the reactants through the reactor in such a manner that the oxidation reaction occurs only in the central portion of the reactor there being an annular space of unreacted reactants surrounding the gases undergoing reaction. This unreacted mixture thus isolates the reacting substances and prevents them from coming in contact with the metal walls of the reactor. To accomplish this, the hydrocarbon-oxygen mixture may be tangentially introduced near the inner walls of the reactor (which may be of spherical, cylindrical, cylindroid or like shape), the reaction products being removed at or near a point along the central axis of such reactor. When operating in such manner, the residence time is naturally greater than the reaction time. The latter is only equal to the period of time during which the hydrocarbons are actually subjected to oxidation.

The reaction temperature may also vary within relatively wide limits depending on a number of variables. For instance, when organic peroxides are to be produced it is possible to employ temperatures of from about 325° C. to about 400° C. The above temperature ranges will depend in part on the character of the primary material, the hydrocarbon-oxygen ratio employed, the presence or absence of diluents, etc.

In order to produce hydrogen peroxides, the incomplete oxidation or combustion according to the process of the present invention should be effected within a relatively narrow temperature range of from about 440° C. to about 500° C. The optimum temperature for the production of maximum yields of hydrogen peroxide will vary depending on the reactants and/or reaction conditions. For instance, for any given saturated hydrocarbon treated, the optimum operating temperature will be lower as the hydrocarbon-oxygen ratio approaches the aforementioned lower limit. Also, with an increase in reaction time, it is possible to lower the operating temperature, while an increase in the quantity of inert diluents present may necessitate an increase in the temperature.

The yield of hydrogen peroxide, other conditions being the same, is not constant throughout the aforementioned desired operating temperature, there being always an optimum temperature. This is graphically represented in Figure I which represents a diagram in which the yields of hydrogen peroxide produced per unit of hydrocarbons introduced into the reaction zone are plotted as a function of the average oxidation temperature employed in the reaction zone. The reaction mixture employed for this series of experiments consisted of propane and oxygen taken in a volumetric ratio of nine to one. The reaction time was in the neighborhood of 4.6 seconds. As seen from this graph, with an increase in the average reaction temperature, there is a marked increase in the hydrogen peroxide after the reaction temperature exceeds 440° C. Furthermore, the graph shows that the optimum temperature is in the neighborhood of 470° C., a further increase in the reaction temperature causing a lowering in the yield of the desired product. Both the preferred range and the optimum temperature will vary somewhat with the operating conditions and the specific saturated aliphatic and/or alicyclic hydrocarbon subjected to the partial oxidation. For instance, some of the hydrocarbons, such as the butanes, may be reacted at somewhat lower temperatures.

The process of the present invention may be effectively realized at atmospheric pressures, although in certain cases it may be advantageous to employ somewhat higher or lower pressures. For example, if the waste gases obtained as a by-product of the reaction are to be employed as fuel gas it may be advantageous to use pressures which are above atmospheric so that these waste gases, after the removal of the hydrogen peroxide and any other desired reaction products, may be directly conveyed to burners in such combustion systems.

The present process is non-catalytic. In fact, the oxidation reaction is preferably conducted under such conditions that the reactants, while undergoing oxidation, do not come in contact with the metal walls of the reactor, or, at least, that these walls are constructed of or lined with metals or substances which do not promote or catalyze the further decomposition of the hydrogen peroxide. Generally speaking, metals of the type of copper and cast-iron, i. e., those which are readily oxidized or corroded by contact with air or oxygen, as well as oxides of such metals, are among the substances which affect adversely the stability of hydrogen peroxide. Therefore, the use of such substances for the construction or lining of reactors is to be avoided. On the other hand, reactors made of or lined with glass (especially Pyrex glass), quartz, or the like, do not possess the aforementioned defects, and may therefore be used. However, when operating on a technical or commercial plant scale, the use of such materials as well as of the corrosion resistant enamelled metals, even for the lining of the inner walls of the reactors, may cause great difficulties and increase both the initial and operating costs of the process. It has been discovered that the corrosion resistant metals, such as Monel metal and the like, and particularly the non-corrosive steels as chrome-nickel alloy steels, such as the V$_2$A steel, the NCT$_3$ steel, and the like, described with their various commercial sources for example in "Engineering Alloys," by N. E. Woldman and A. J. Domblatt, published by the American Society for Metals in 1936, all of which are corrosion resistant or oxidation resistant under the operating conditions employed for the partial or incomplete oxidation of saturated hydrocarbons to produce hydrogen peroxide, are suitable as materials to be employed for construction and/or lining of the walls of the oxidation reaction chambers, as well as of the exit or discharge pipes which may be used to convey the reaction products to condensers, coolers or the like. It has been still further discovered that even these corrosion resistant materials appear to have a detrimental effect on the peroxide-producing reaction, although this effect is of a considerably lesser magnitude or intensity than that of the aforementioned readily corrosive or oxidizable metals. This detrimental effect of the corrosion or oxidation resistant materials, furthermore, exists only when such materials are at the relatively high operating temperatures (i. e., 400° C. to 500° C. or higher), there being no trace of any adverse effect noted when the walls of the reaction vessel are maintained at temperatures of about 200° C. or lower. Therefore, in one of its specific embodiments or phases, the present invention includes the realization of the above-defined process of producing peroxide-containing reaction products which predominate in hydrogen peroxide by effecting the incomplete or partial oxidation of saturated aliphatic and/or alicyclic hydrocarbons, or mixtures predominating in such hydrocarbons, in reaction vessels constructed of or lined with materials which are resistant to oxidation or corrosion. The invention further includes the maintenance of the walls of such reactors at temperatures which do not exceed about 200° C., this being effected, for example, by providing the reactor walls with jackets through which suitable fluids, such as ethylene glycol, mineral oils or their fractions, water, steam, and the like, may be continuously or intermittently circulated to extract the heat of oxidation and to maintain the temperature of the inner walls at below about 200° C. Obviously, any other means of extracting this heat may also be used. For instance, at least a partial cooling of the reactor walls may be effected by bringing the incoming cool reactants, i. e., hydrocarbons and/or oxygen, in contact with the outer surface of the reactor walls, these reactants, while cooling such walls, being pre-heated prior to their introduction into the reactor itself.

One of the preferred methods of effecting the incomplete oxidation according to the process of the present invention is to introduce the hydrocarbon-oxygen mixture substantially tangentially along the inner walls of the reactor, the gaseous mixture then passing toward the axial center of the reactor wherein the oxidation reaction occurs and from where the reaction products may then be withdrawn and conveyed to suitable cooling and/or condensing means. When operating in this manner the reactants, while undergoing oxidation, do not come in contact with the reactor walls.

For the purpose of illustrating the process, and for a better understanding of the method of executing the same, Figure II of the drawing represents diagrammatically an embodiment of an apparatus which is effective for the partial oxidation of saturated hydrocarbons to hydrogen peroxide-containing oxidation reaction products. Referring to this figure, numeral 10 denotes a cylindrical reaction vessel which is constructed of, or the inner walls of which are lined with one of the above-described materials, such as V₂A steel, which are resistant to oxidation with air or oxygen under the operating conditions. This reactor 10 is surrounded by a cooling jacket 11 through which a suitable cooling fluid, such as ethylene glycol or the like, may be circulated, this cooling fluid being introduced into the jacket 11 via pipe 12 and withdrawn therefrom through pipe 13. The gaseous hydrocarbon-oxygen mixture is introduced into the reactor 10 via pipe 15, this pipe being provided with a preheater 16 which latter is usually employed only during the initial stages to initiate the oxidation reaction. As soon as such oxidation or combustion is started in the reactor 10, the preheater may be cut out of the system, or the conveyance of any preheating medium therethrough may be stopped. As shown in the drawing, the discharge end 17 of inlet pipe 15 is substantially tangential to the inner walls of the reaction vessel 10, so that the reactants enter the vessel, preferably with a turbulent motion, substantially tangentially to the walls thereof. These reactants thus first flow along the relatively cool walls of the reactor, subsequently passing towards the axial center or interior of the vessel wherein the oxidation reaction proper occurs. The reaction products thus formed are then withdrawn through discharge pipe 18 and are substantially immediately passed into a condenser 19, the temperature of which is such that the hydrogen peroxide and the steam are condensed, while the unreacted hydrocarbons together with the other reaction products, such as the aldehydes, remain in the vapor state. The separation of the two phases is then effected in vessel 20 from which the liquid phase containing the hydrogen peroxide is withdrawn via line 21. The uncondensed fraction is removed through line 23, and, if desired may be further cooled in condenser 24 to liquefy the aldehydes, such as formaldehyde and acetaldehyde. The separation of the two phases thus formed may be effected in separator 24 from which the liquid phase is withdrawn via line 25. The remaining gaseous phase, containing the unreacted hydrocarbons, is withdrawn through line 26, and, after commingling with fresh quantities of oxygen or of a gas containing molecular oxygen, may be re-introduced back into line 15 for further partial oxidation according to the process of the present invention. Obviously, prior to such recycling, it is possible to first separate the unreacted hydrocarbons from any of the other reaction products formed during the oxidation reaction. Also, prior to the recycling, additional quantities of the saturated hydrocarbons may be added continuously or otherwise to the remaining unreacted hydrocarbons removed from the system through line 26.

Since the reaction time should be controlled so as to prevent a decrease in the yield of the hydrogen peroxide, it is desirable to cool the reaction products in condenser 19 as soon as possible after withdrawal from the reaction zone. Also, it has been noted that the aldehydes and certain other by-products formed during the controlled oxidation of the saturated hydrocarbons, have a tendency to react with the hydrogen peroxide, thus resulting in a loss of this desirable product. This may be avoided, or at least greatly inhibited, by effecting the cooling in condenser 19 under such conditions that the liquid phase removed from separator 20 via line 21 comprises an aqueous solution of the hydrogen peroxide, the unreacted hydrocarbons, aldehydes and the other reaction products remaining in a vapor state, and being withdrawn from the top of separator 20 through line 22. An effective method for the separate recovery of the peroxide-containing solution consists in controlling the temperature in condenser 19. For example, when propane is oxidized according to the present invention, an efficient separation of the hydrogen peroxide is attained by maintaining said temperature at about 40° C. Obviously, this temperature may vary with the reactants employed.

Instead of employing a structure of the type shown in Figure II in which the reactants are introduced into the reaction vessel tangentially with respect to the walls but only in one direction, it is also possible to employ a structure in which the reactants are introduced into the vessel through a distributor head in such a manner that the gases entering the reactor flow or pass along the walls of the reactor in two or more directions. Such a structure is disclosed in Figure III which represents a section through a reactor 10 surrounded by a cooling jacket 11. In this structure the gas conveying pipe 15 is provided within the reactor vessel with a distributor head 20 which is equipped with a plurality of nozzles 20 arranged in such a manner that the gases or gaseous mixture introduced through pipe 15 flows along the inner walls of vessel in diametrically opposite directions from the distributor head. The reactants, after meeting substantially at a point diametrically opposite from that at which they enter the reactor, are then forced towards the interior or axial center of the reactor wherein the oxidation reaction occurs.

The following example is presented for the purpose of illustrating the present process of producing hydrogen peroxide. It is to be understood, however, that the example is to be considered as merely illustrative of the invention and not as limiting the invention to any of the specific embodiments described therein, the invention being co-extensive in scope with and solely limited by the appended claims.

Example

The reactor employed for this test consisted of a spherical vessel constructed of V2A steel and having a capacity of 200 liters. This vessel was surrounded by a cooling jacket through which ethylene glycol was circulated under such conditions of temperature and rate that the temperature of the wall of the reaction vessel was maintained at about 150° C. throughout the oxidation reaction conducted in the vessel.

A gaseous mixture, consisting of 90% by volume of propane and 10% by volume of oxygen, was introduced substantially at atmospheric pressure, into the above reactor at a rate of about 70 cubic meters per hour. This introduction was effected through an inlet pipe in such a manner that the reactants first flowed along the inner walls of the vessel, the oxidation occurring in the interior of the vessel at an average temperature of about 470° C. Although the residence time of the reactants in the reaction vessel was about 10 seconds, the actual reaction time (i. e., the actual period of time during which propane was subjected to oxidation) was in the neighborhood of 5 seconds, after which the reaction products were immediately conveyed to a condenser in which the products were cooled to a temperature of about 40° C. This caused a condensation of an aqueous solution mainly containing hydrogen peroxide, the unreacted propane, aldehydes and other reaction products remaining in the vapor phase. The separated aqueous solution contained about 20 mg. equivalents of oxygen per cubic centimeter of solution, about 8 liters of such solution being recoverable from each 70 cubic meters of propane-oxygen mixture conveyed through the reactor.

By recycling most of the uncondensed gases (after the addition of fresh quantities of propane and oxygen) it was possible to increase materially the yield of the hydrogen peroxide-containing solution. For instance, by such repeated recirculation, it was possible to increase the yield of this solution to about 60 liters per 70 cu. meters of the gaseous mixture thus subjected to oxidation in accordance with the process of the present invention. In fact, in some instances it was possible to produce about 40 parts by weight of hydrogen peroxide per 100 parts of propane, or the like, employed.

When the reaction products obtained by effecting the oxidation reaction according to the described process are subjected to fractional cooling, for example, at a temperature of about 40° C., the condensate comprises an aqueous solution containing major proportions of hydrogen peroxide together with some organic peroxides. These peroxides may be separated by any of the known means, for instance, by extraction with saturated ethers and like substantially water insoluble substances in which the peroxides are readily soluble. After separation from the solvent the substantially anhydrous peroxidic mixture predominates in hydrogen peroxide and contains relatively minor proportions of organic peroxides, the quantity of these organic peroxides varying somewhat with the operating conditions employed.

The reaction vessel may be of any shape, but preferably have arcuated walls. For example, the reactor may be spherical, cylindrical or cylindroidal in form.

Although the above description was made with particular reference to the production of hydrogen peroxide by the partial oxidation of propane, it is to be understood that other saturated aliphatic and/or alicyclic hydrocarbons, and particularly the normally gaseous saturated aliphatic and/or alicyclic hydrocarbons having two or more carbon atoms per molecule, as well as mixtures thereof, and mixtures containing other gaseous substances, such as unsaturated hydrocarbons, nitrogen, carbon monoxide, carbon dioxide, and the like, may also be treated according to the present process. Furthermore, instead of pure oxygen, it is possible to employ gaseous substances containing molecular oxygen, for example, air. It is to be noted, however, that in all such cases it is essential to maintain the aforementioned ratios of the saturated hydrocarbons to oxygen. It is also preferable to avoid employing mixtures containing more than about 30% by volume of gases or gaseous substances other than the saturated hydrocarbons and oxygen. Also, by modifying the operating conditions as well as by employing, for example, unsaturated hydrocarbons, it is possible to produce organic peroxides.

I claim as my invention:

1. A continuous process for the production of hydrogen peroxide, which comprises mixing propane with oxygen in a volumetric ratio of about nine volumes of propane per volume of oxygen, continuously conveying said mixture in the vapor state and substantially at atmospheric pressure through a reactor having a corrosion-resistant inner surface, maintaining said surface at a temperature below 200° C., introducing next to said surface within the reactor the aforesaid mixture of propane and oxygen at such a rate that the mixture remains at a temperature such that the propane and oxygen will not react, conducting said mixture from such area adjacent the reactor surface to a zone in the reactor in which a temperature of between about 440° C. and about 500° C. is maintained, maintaining said mixture in the last-mentioned zone for a period of between about three seconds and about ten seconds to produce a reaction product containing oxygenated compounds including water, hydrogen peroxide, organic peroxide and aldehydes, withdrawing and promptly and rapidly cooling the reaction product to a temperature of about 40° C. without contact with a readily oxidized surface to condense an aqueous solution rich in hydrogen peroxide, mixing at least a portion of the remaining vaporous mixture with additional quantities of oxygen, and reconveying the mixture thus produced back into the reactor for further oxidation and production of additional quantities of hydrogen peroxide.

2. The process according to claim 1, wherein the aldehydes are withdrawn from the vaporous mixture prior to its commingling with additional quantities of oxygen and prior to its recycling back into the reactor.

3. In a process for the production of hydrogen peroxide, the steps of mixing gaseous saturated hydrocarbons having at least two carbon atoms per molecule with oxygen in a volumetric ratio of at least four volumes of the hydrocarbon per volume of oxygen, introducing the vaporous mixture thus obtained into a reactor having a corrosion-resistant inner surface, maintaining said surface at a temperature of below 200° C., introducing next to said surface within the reactor the aforesaid mixture at such a rate that the mixture remains at a temperature such that substantially no hydrocarbon oxidation will occur in said area, conducting the vaporous mixture from such area adjacent the reactor surface to a zone in the reactor in which a temperature of between about 400° C. and about 500° C. is maintained, maintaining said mixture in the last-mentioned zone for a period of between about three seconds and about ten seconds to produce a reaction product containing oxygenated compounds including water and hydrogen peroxide, withdrawing the reaction product from the reaction zone, promptly cooling said product, and fractionally condensing an aqueous hydrogen peroxide solution therefrom.

4. In a process for the production of hydrogen peroxide, the steps of mixing a normally gaseous aliphatic saturated hydrocarbon having at least two carbon atoms per molecule with oxygen in a ratio of at least four volumes of the hydrocarbon per volume of oxygen, introducing the vaporous mixture thus formed into a reactor having a corrosion-resistant inner surface, maintaining said surface at a temperature of below 200° C., introducing next to said surface within the reactor the aforesaid mixture at such a rate that the mixture remains at a temperature such that substantially no hydrocarbon oxidation will occur in said area, conducting the vaporous mixture from such area adjacent the reactor surface to a zone in the reactor in which a temperature of between about 400° C. and about 500° C. is maintained, maintaining said mixture in the last-mentioned zone for a period of between about three seconds and about ten seconds to produce a reaction product containing oxygenated compounds including water and hydrogen peroxide, withdrawing the reaction product from the reaction zone, promptly cooling said product, and fractionally condensing therefrom an aqueous solution rich in hydrogen peroxide.

5. In a process for the production of a peroxidic compound containing major amounts of hydrogen peroxide, the steps of mixing a normally gaseous aliphatic saturated hydrocarbon having at least two carbon atoms per molecule with oxygen in a ratio of at least four volumes of the hydrocarbon per volume of oxygen, introducing the vaporous mixture thus obtained into a reactor having a corrosion-resistant inner surface, maintaining said surface at a temperature below 200° C., introducing next to said surface within the reactor the aforesaid mixture at such a rate that the mixture remains at a temperature such that substantially no hydrocarbon oxidation will occur in said area, conducting the vaporous mixture from such area adjacent the reactor surface to a zone in the reactor in which a temperature of between about 400° C. and about 500° C. is maintained, maintaining said mixture in the last-mentioned zone for a period of between about three seconds and about ten seconds to produce a reaction product containing oxygenated compounds including water and peroxidic compounds predominating in hydrogen peroxide, withdrawing the reaction product from the reaction zone, promptly cooling said product to fractionally condense therefrom an aqueous solution containing major quantities of hydrogen peroxide, and separately recovering therefrom the peroxidic compounds in a substantially anhydrous form.

6. In a process for the production of hydrogen peroxide, the steps of mixing gaseous saturated hydrocarbons having at least two carbon atoms per molecule with oxygen in a volumetric ratio of at least four volumes of the hydrocarbon per volume of oxygen, introducing the vaporous mixture thus obtained into a reactor having a corrosion-resistant inner surface, maintaining said surface at a temperature of below 200° C., introducing next to said surface within the reactor at least a portion of said mixture at such a rate that the mixture remains at a temperature such that substantially no hydrocarbon oxidation will occur in said area, conducting the vaporous mixture to a zone in the reactor in which a temperature of between about 400° C. and about 500° C. is maintained, maintaining said mixture in the last-mentioned zone for a period of between about three seconds and about ten seconds to produce a reaction product containing oxygenated compounds including water and hydrogen peroxide, withdrawing the reaction product from the reaction zone, promptly cooling said product, and fractionally condensing an aqueous hydrogen peroxide solution therefrom.

7. In a process for the production of hydrogen peroxide, the steps of mixing propane and oxygen in a volumetric ratio of about nine volumes of propane per volume of oxygen, introducing said mixture in the gaseous state into a reactor having a corrosion-resistant inner surface, maintaining said surface at a temperature of about 150° C., introducing next to said surface within the reactor the aforesaid mixture at such a rate that the mixture remains at a temperature such that substantially no hydrocarbon oxidation will occur in said area, conducting the gaseous mixture from such area adjacent the reactor surface to a zone in the reactor in which a temperature of about 470° C. is maintained, maintaining said mixture in the last-mentioned zone for a period of about five seconds to produce a reaction product containing oxygenated compounds including water, hydrogen peroxide, organic peroxides and aldehydes, withdrawing and promptly and rapidly cooling the reaction product to a temperature of about 40° C., and recovering from said reaction product an aqueous hydrogen peroxide solution.

8. A continuous process for the production of peroxide compounds which comprises mixing propane with oxygen, continuously conveying the vaporous mixture thus obtained substantially at atmospheric pressure through a reactor having a corrosion-resistant inner surface, maintaining said surface at a temperature of below 200° C., continuously introducing next to said surface within the reactor a mixture of propane and oxygen at such a rate that said mixture remains at a temperature such that the propane and oxygen will not react, conducting said mixture from such area to a zone in the reactor in which a temperature of between about 300° C. and about 500° C. is maintained for a period of between about 3 seconds and about 10 seconds to produce a reaction product containing a substantial amount of peroxides, water, aldehydes and other oxygenated compounds, withdrawing the reaction mixture from the reaction zone, cooling said reaction mixture to recover therefrom an aqueous solution rich in the peroxide compounds, mixing at least a portion of the remaining vaporous mixture with additional quantities of oxygen, and reconveying said mixture back into the reactor for further oxidation and production of additional quantities of peroxide compounds.

9. The process according to claim 8 wherein the aldehydes are withdrawn from the vaporous reaction mixture prior to its mixing with additional quantities of oxygen and prior to its recycling back into the reactor.

10. A process for the production of peroxide compounds which comprises mixing oxygen with a normally gaseous aliphatic hydrocarbon having at least two carbon atoms per molecule, continuously introducing the vaporous mixture thus formed into a reactor presenting a corrosion-resistant inner surface, maintaining said surface at a temperature of below 200° C., continuously introducing next to said surface within the reactor the aforesaid hydrocarbon-oxygen mixture at such a rate that said mixture remains at a temperature such that the hydrocarbon and oxygen will not react, conducting said mixture from such area to a zone in the reactor, in which a temperature of between about 300° C. and about 500° C. is maintained for a period of between about 3 seconds and about 10 seconds, to produce a reaction mixture containing a substantial amount of peroxide compounds, withdrawing the reaction mixture, and recovering the peroxide compounds therefrom.

11. In a process for the production of peroxide compounds, the steps of introducing a mixture of propane and oxygen in the gaseous state into a reactor having a corrosion-resistant inner surface, maintaining said surface at a temperature of about 150° C., introducing next to said surface within the reactor the aforesaid mixture at such a rate that the mixture remains at a temperature such that substantially no hydrocarbon oxidation will occur in said area, conducting the gaseous mixture from such area adjacent the reactor surface to a zone in the reactor in which a temperature of about 470° C. is maintained, maintaining said mixture in the last-mentioned zone for a period of about five seconds to produce a reaction product containing a substantial amount of peroxides, water, aldehydes and other oxygenated compounds, and cooling said reaction mixture to recover therefrom an aqueous solution rich in peroxide compounds.

ANTOINE EUGENE LACOMBLE.